United States Patent [19]

Kroniger et al.

[11] 4,157,840

[45] Jun. 12, 1979

[54] MOTOR VEHICLE WHEEL SUSPENSION ARRANGEMENT

[75] Inventors: Wilhelm Kroniger, Münchingen-Kallenberg; Wolfgang Eyb, Leonberg, both of Fed. Rep. of Germany

[73] Assignee: Dr. Ing. h.c.F. Porsche Aktiengesellschaft, Fed. Rep. of Germany

[21] Appl. No.: 726,558

[22] Filed: Sep. 27, 1976

[30] Foreign Application Priority Data

Sep. 27, 1975 [DE] Fed. Rep. of Germany ....... 2543189

[51] Int. Cl.² ............................ B60G 1/00; B62D 7/06
[52] U.S. Cl. .................................. 280/688; 180/73 D
[58] Field of Search ............. 180/73 D; 280/718, 719, 280/720, 675, 699, 697, 688, 690

[56] References Cited

U.S. PATENT DOCUMENTS 3,883,152  5/1975  Carbon ................................. 280/675

Primary Examiner—Richard A. Bertsch
Attorney, Agent, or Firm—Craig and Antonelli

[57] ABSTRACT

A vehicle wheel suspension arrangement which includes a wheel guide assembly having a transverse strut at least a portion of which is displaceable in a vehicle longitudinal direction and a form-rigid longitudinal strut. Bearing elements having a variable elasticity pivotally mount the longitudinal strut at the vehicle body with additional bearing elements of differing elasticities mounting the wheel guide assembly at a wheel carrier.

33 Claims, 5 Drawing Figures

MOTOR VEHICLE WHEEL SUSPENSION ARRANGEMENT

The present invention relates to a suspension arrangement and, more particularly, to a motor vehicle wheel suspension system which includes a wheel guide rod elastically attached at the vehicle body by way of a longitudinal strut, a transverse strut, and a wheel carrier.

By virtue of circumferential forces which occur at the wheels of motor vehicles during a load change occasioned by, for example, braking, acceleration, or removal of gas, i.e. deceleration, a wheel position change results in the conventional supports of wheel guide rods which position change is such that the wheels are repositioned in an inward or track lead direction of the vehicle during a braking and deceleration and experience a repositioning in an outward or track lag direction when the vehicle is negotiating a curve by virtue of occurring side forces whereby, in all these instances, an undesirable override effect results.

The aim underlying the present invention essentially resides in providing a vehicle suspension system which avoids by simple means the aforementioned shortcomings encountered in the prior art so as to improve support of the vehicle wheels under all driving conditions and load changes on the vehicle suspension system and, especially when the vehicle is negotiating a curve.

According to one feature of the present invention, a wheel guide rod and guide-rod bearing connecting the wheel guide rod with the wheel carrier and vehicle body are so constructed and arranged so as to make the vehicle suspension system responsive to changes in driving conditions and load changes whereby the undesirable override effect is eliminated.

According to the present invention, a transverse strut is provided which is constructed such that at least a portion thereof is deflectable in the longitudinal direction of the vehicle with a longitudinal strut being constructed with at least a form-stable portion which is pivotally arranged at the vehicle body in a guide-rod bearing of variable elasticity. The wheel guide rod is held at the wheel carrier by way of bearings of variable elasticity.

Additionally, according to further feature of the present invention, the guide-rod bearing of the longitudinal strut at the side of the vehicle body is arranged at an angle with the vehicle longitudinal axis and the longitudinal strut is elastically movable in the axis of the guide-rod bearing with the transverse strut being constructed as an elastic spring element such as, for example, a leaf spring.

In accordance with yet another feature of the present invention, the guide-rod bearing, arranged in the forward vehicle direction, at the side of the vehicle is radially more yielding than a guide-rod bearing arranged at the vehicle wheel behind the first guide-rod bearing. By virtue of this arrangement and construction of the wheel guide rod and guide-rod bearings at the vehicle wheel, advantageously an equalization of the wheel position changes in the track lag direction through the circumferential forces acting on the wheel are compensated in a simple manner. Additionally, a wheel position change is obtained at the outer wheel in a curve in a track lead direction with the occurring side forces normally present when the wheel is negotiating a curve. The bending elastic transverse strut makes an elastic movement of the longitudinal strut and the wheel guide rod possible in an extremely simple manner.

A further advantage is obtained in accordance with the present invention with the guide-rod bearings on the side of the wheel arranged in the driving direction behind a vertical wheel middle or center transverse plane with the guide-rod bearing arranged immediately behind the center transverse plane being constructed radially more yielding than the more remotely arranged guide-rod bearing. By virtue of this arrangement and selection of bearings of variable elasticity, interposed between the wheel guide rod and wheel carrier, the outer wheel in a curve may, under the effect of the side guide forces acting thereon, execute a more or less large wheel position change in the inward or track lead direction whereby an almost always desired "understeering effect" is obtained.

Additionally, in accordance with the present invention, the guide-rod bearings at the side of the wheel are disposed at an angle with respect to a vehicle longitudinal axis with these guide-rod bearings being arranged along the same axis or axle. Also, the bearing axis may extend parallel to the pivotal or swinging axis of the wheel guide rod.

According to yet another feature of the present invention, the guide-rod bearing at the side of the vehicle body for the longitudinal strut, as viewed laterally of the vehicle, is arranged inclined with respect to a horizontal plane in the forward vehicle direction. By this arrangement, during braking of the vehicle, a larger track lead position of the vehicle wheels is attained with respect to the other occurring circumferential forces in a very simple manner.

According to the present invention, the guide-rod bearing of the longitudinal strut, at the side of the vehicle body is preferably constructed as a metal-rubber bearing and is provided, in a conventional manner, between elastic layers thereof with a number of vulcanized intermediate bushings.

For the support of the longitudinal strut at the vehicle body, according to a further feature of the present invention, a sliding bearing having defined axial movability may be employed.

With the construction of a wheel suspension arrangement according to the present invention, an improved self-steering behavior of the motor vehicle is readily attained in a simple manner. By means of the guide-rod bearings having variable radial elasticities between the guide rod and wheel carrier, the outer wheel in a curve may, under the effect of the lateral guide forces produced by such wheel, execute a more or less large wheel position change in the direction of track lead.

Additionally, circumferential forces acting on the outer wheel in a curve by means of the construction of the guide-rod bearings at the body side according to the present invention, may cause a guiding into the path of the wheel to thereby effect therewith a stabilization of the straight run of the vehicle wheel.

Accordingly, it is an object of the present invention to provide a vehicle wheel suspension arrangement which avoids by simple means the aforementioned shortcomings and drawbacks encountered in the prior art.

Another object of the present invention resides in providing a vehicle wheel suspension arrangement which is relatively simple in construction and therefore relatively inexpensive.

A further object of the present invention resides in providing a vehicle wheel suspension system which minimizes if not eliminates the undesirable override effect during load changes on the vehicle suspension system caused by braking, acceleration, deceleration and/or negotiation of a curve.

Yet another object of the present invention resides in providing a wheel suspension system wherein an equalization of wheel position changes in a track lag direction is compensated as well as a wheel position change in the track lead direction of an outer wheel in a curve is obtained.

These and other objects, features, and advantages of the present invention will become more apparent from the following description when taken in connection with the accompanying drawings which show, for the purposes of illustration only, two embodiments in accordance with the present invention, and wherein.

Figure 3:
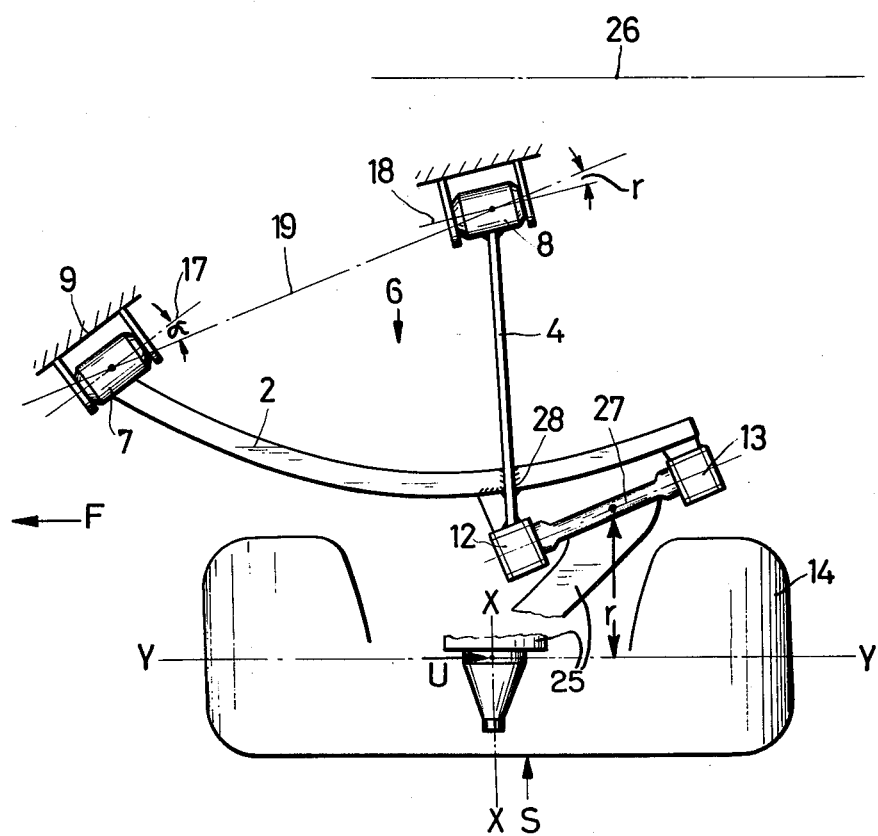
Figure 4:
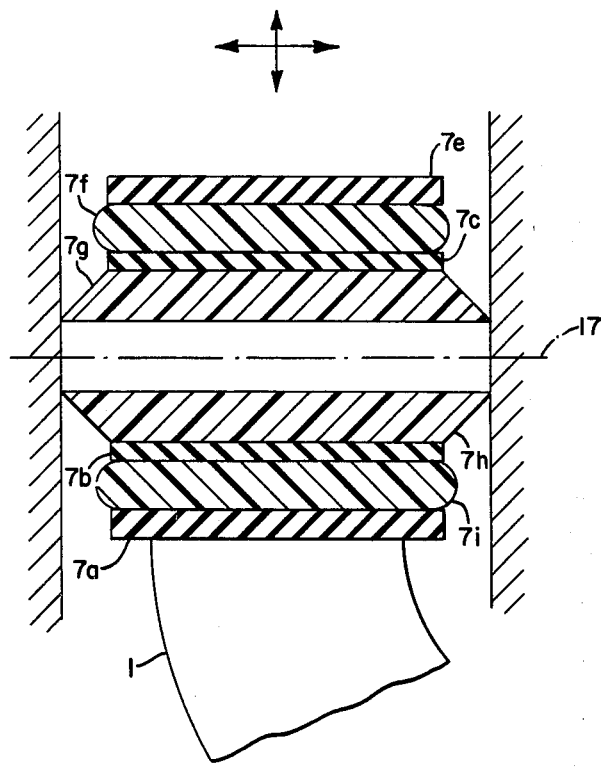
Figure 5:
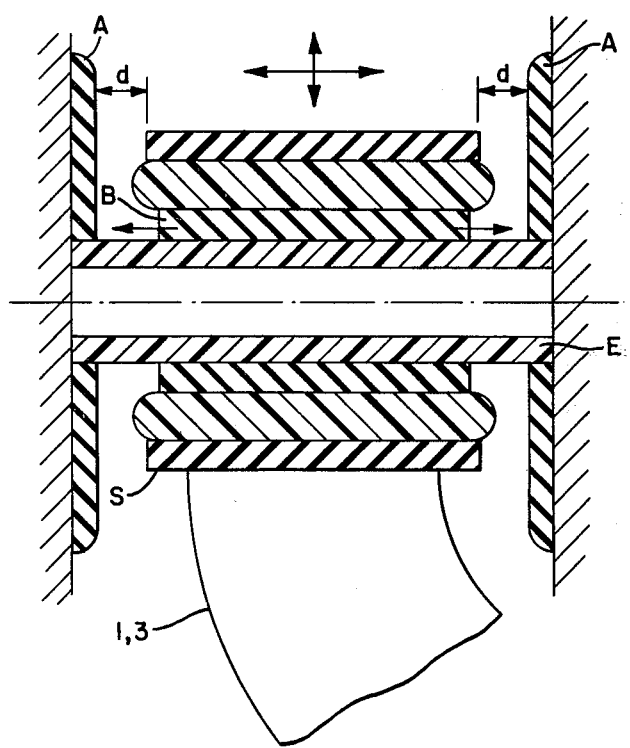

FIG. 3 is a top view of a further embodiment of an independent wheel suspension system in accordance with the present invention FIG. 4 is a cross-sectional view, on an enlarged scale, of a metal-rubber bearing for a longitudinal strut of a wheel suspension system in accordance with the present invention; and FIG. 5 is a cross-sectional view, on an enlarged scale, of a slide bearing construction utilized in the wheel suspension system of the present invention.

Figure 1:
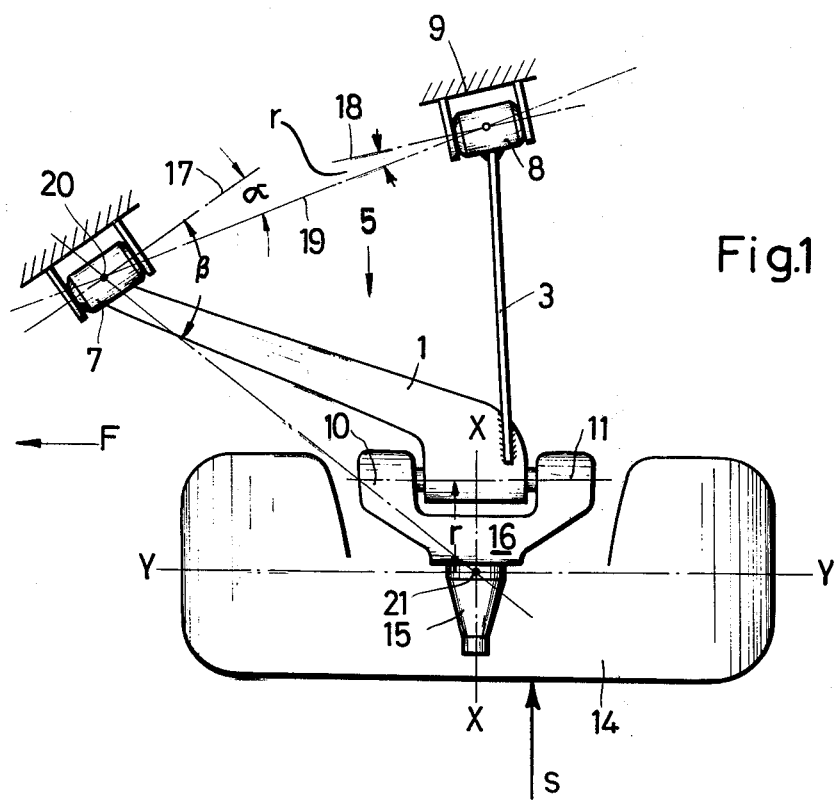
FIG. 1 is a top partial schematic view of one wheel of an independent wheel suspension system in accordance with the present invention.

Referring now to the drawings wherein like reference numerals are used throughout the various views to designate like parts, and more particularly to FIG. 1, according to this figure, a left rear wheel 14 of a vehicle having independent suspended rear wheels is supported on a shaft pin 15 provided on a wheel carrier 16. For the sake of clarity only the lower portion of the wheel guide assembly, namely, a delta guide rod is shown in the figure and, as apparent, an upper portion of the wheel guide assembly may include a wheel guide rod (not shown) attached to the wheel carrier 16 with such guide rod being fashioned as a stiff transverse strut or the like supported at the vehicle body and held by means of a spring leg (not shown) which supports itself with its upper end at an abutment of the vehicle body. While only the left wheel 14 is shown in the drawing, it is understood that the above as well as the following description is equally applicable to the right rear wheel of the vehicle.

As shown in FIG. 1, the rear axle of the vehicle includes a wheel guide assembly generally designated by the reference numeral 5 composed of a longitudinal strut 1 and a transverse strut 3 with one end of each of the struts 1,3 being pivotally or swingably arranged at the vehicle body 9 by way of bearings 7,8, respectively. The other end of the strut 1 is pivotally connected to the wheel carrier 16 by way of bearings 10,11 with the other end of the strut 3 being solidly connected with the strut 1.

The longitudinal strut 1 is constructed so as to be stiff or rigid whereas the transverse strut 3 is fashioned so as to be elastically bendable in the vehicle longitudinal direction. Preferably, the transverse strut 3 is formed by a leaf spring arranged edgewise with respect to the vehicle longitudinal center plane.

Figure 2:
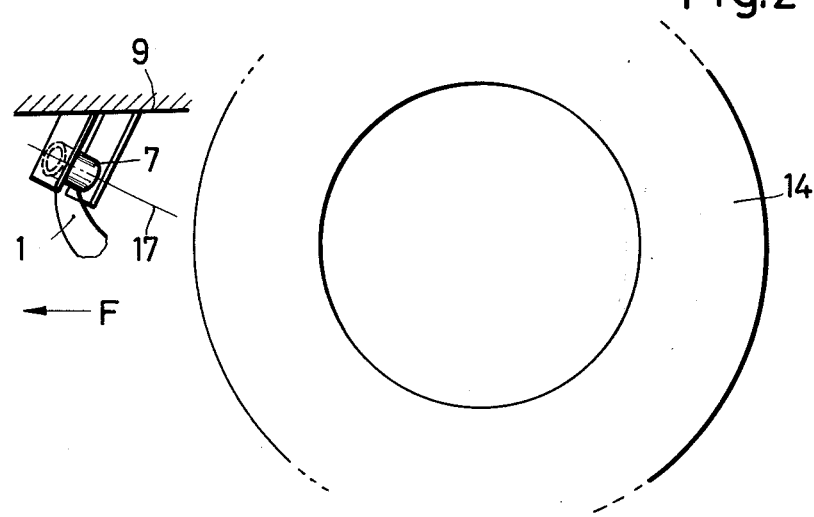
FIG. 2 is a schematic side view of the wheel suspension system of FIG. 1 illustrating the front guide-rod bearing at the vehicle body side.

The guide-rod bearings 7,8 of the struts 1,3 have bearing axes 17,18, respectively, which extend at angles $\alpha, \gamma$, respectively, with respect to a swinging or pivot axis 19 of the guide rod assembly 5. The bearing axis 17 subtends with an imaginary plane passing through a bearing center 20 and wheel center 21 and angle $\beta$ which is less than 90°. Additionally, the axis 17 of the guide-rod bearing 7 at the vehicle body 9, as viewed in the direction designated by the arrow F, is arranged at an ascending inclination with respect to a horizontal plane as shown most clearly in FIG. 2.

The bearing 7 of the longitudinal strut 1 at the vehicle body 9 is constructed stiffer or more rigid by multiples in the radial load direction than in the lateral load direction, i.e., the bearing does not yield in the case of forces engaging at perpendicular to the longitudinal axis of bearing and the bearing is yielding in the direction of its longitudinal axis. The bearing 7 acts in support of an elastic movement or shifting of the wheel guide assembly 5 along the bearing axis 17 so that the assembly can move in the direction of travel or against it.

As shown in FIG. 4, the bearing 7 is constructed as a metal-rubber bearing and is formed essentially by a plurality of concentric vulcanized intermediate bushings 7a, 7b, 7c, 7e between which are interposed layers 7f, 7g, 7h, 7i of elastic material. By virtue of this construction, a bearing is created which has a much stiffer radial force characteristic than axial force characteristic.

In lieu of a metal-rubber bearing construction as shown in FIG. 5, a sliding bearing may also be utilized which sliding bearing is provided with a definite axial shift distance d in which a sleeve S accommodating the longitudinal strut 1 operatively cooperates with abutment A of rubber or similar elastic material with a bushing B sliding on a support bushing E connected to the vehicle body 9.

The longitudinal strut 1 and the transverse strut 3 are pivotally arranged at the wheel carrier 16 in bearings 10,11 arranged on respective sides of a vertical wheel center plane X—X extending transversely to the vehicle longitudinal center plane with the bearings 10,11 being provided with variable radial elasticity for the purpose of lateral force understeering.

As shown in FIG. 3, a wheel guide rod assembly generally designated by the reference numeral 6 is provided and composed of a longitudinal strut 2 and a transverse strut 4 with one end of each of the struts 2,4 being pivotally or swingably arranged at the vehicle body 9 by way of the bearings 7,8. The other end of the strut 2 is pivotally or swingably connected to a wheel carrier 25 by way of bearings 12,13. The bearings 12,13 are arranged at an inclination toward the outside of the vehicle with respect to the vehicle longitudinal axis 26 and, as viewed in the driving direction of the vehicle, the bearings 12,13 are arranged on the same bearing axis 27 with both bearings being disposed behind a vertical wheel center transverse plane X—X whereby the bearing axis 27 extends parallel to the swinging or pivot axis 19 of the wheel guide assembly 6.

The bearing 12, disposed nearest to the wheel 14, is arranged immediately behind the vertical wheel center transverse plane X—X and is constructed so as to have a larger elasticity in a radial load direction than the elasticity of the guide-rod bearing 13 arranged more remotely from the wheel center transverse plane X—X.

The different elasticities of the bearings 12,13 may be realized by fashioning each of the bearings of a plurality of rubber elements having corresponding kidney-shaped recesses.

The longitudinal strut 2 together with the transverse strut 4 form a crossed wheel-guiding part whereby the free ends of the struts 2 and 4 carry the bearings 12,13 at the wheel side. For this purpose, the longitudinal strut 2 is bow-shaped and is connected with the two bearings 12,13 with the transverse strut 4 being hinged beyond a common connection 28 at the longitudinal strut 2 only at the bearing 12 and intermediately behind the vertical wheel center transverse plane X—X.

The mode of operation of the wheel guide assemblies 5,6 when acted upon by circumferential forces U and side forces S is as follows:

By virtue of the inclined arrangement of the longitudinal struts 1 or 2 at the bearings 7, a shifting of the wheel guide assembly 5 or 6 occurs, for example, during a braking or deceleration of the vehicle. The braking force acting at the wheel constitutes a circumferential force U and first effects, by way of bearings 10,11 or 12,13, a positioning of the wheel in a track lag direction by virtue of the formation of a lever arm r between a vertical wheel center longitudinal plane Y—Y and a portion of the wheel carrier 16 or 25 through which the bearing axes of the bearings 10,11 or 12,13 extend.

Through a reaction force engaging at the bearing centers 20 of the guide-rod bearings 7, the longitudinal strut 1 or 2 is shifted, by virtue of the inclined positioning and axial elasticity of the bearings 7, in a direction opposite the driving direction F of the vehicle along the bearing axis 17 to the rear and, therefore, also toward the inside, i.e., toward the vehicle longitudinal axis.

At the same time the struts 1 or 2 are shifted, the elastic bending transverse struts 3 or 4 are shifted correspondingly. The wheel guide assembly 5 or 6 is, through this movement, shifted in a track lead direction and compensate for the wheel going into the track lag position. The same compensation effect occurs with a deceleration or removal of gas.

During an accleration of the vehicle, a shifting into a track lead direction of the wheel 14 is effected by a movement developed through the lever arm r.

By virtue of the inclined arrangement of the bearing 7 of the longitudinal strut 1 or 2 with respect to a horizontal plane it is possible that during a braking operation of the vehicle, a stronger track lead position is attained as compared to the position during an acceleration. When negotiating a curve, the wheel position at the outside of the curve can, under the effect of the lateral guide force applied to it, execute a wheel position change in a track lead direction by virtue of the variable radial elasticities of the bearing 11, 13.

While we have shown and described several embodiments in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

What is claimed:

1. A wheel suspension arrangement for vehicles which include a vehicle body and a wheel carrier means, the improvement comprising: a wheel guide means including a transverse strut means constructed so that at least a portion thereof is displaceable in a vehicle lontitudinal direction, a longitudinal strut means constructed so as to be form-rigid associated with the transverse strut means, a first bearing means having a variable elasticity for pivotally mounting the longitudinal strut means at the vehicle body, and further bearing means having differing elasticities for mounting the wheel guide means at the wheel carrier means.

2. An arrangement according to claim 1, wherein the first bearing means is arranged at the vehicle body at an inclination to a longitudinal axis of the vehicle, and wherein the longitudinal strut means is elastically shiftable along a bearing axis of the first bearing means.

3. An arrangement according to claim 2, wherein the transverse strut means is constructed so as to be elastically bendable in the vehicle longitudinal direction.

4. An arrangement according to claim 3, wherein said transverse strut means is formed of a leaf spring.

5. An arrangement according to claim 4, wherein means are provided for mounting the leaf spring at the vehicle body so as to permit pivotal movement of the leaf spring relative to the vehicle body.

6. An arrangement according to claim 5, wherein said mounting means includes an elastic bearing element interposed between an end of the leaf spring and the vehicle body.

7. An arrangement according to claim 6, wherein the leaf spring means is arranged in a vertical plane extending transversely of a longitudinal center plane of the vehicle.

8. An arrangement according to claim 2, wherein means are provided for mounting the transverse strut means at the vehicle body so as to be pivotal with respect to the vehicle body to permit deflection.

9. An arrangement according to claim 8, wherein the mounting means includes a bearing element interposed between an end of the transverse strut means and the vehicle body.

10. An arrangement according to claim 9, wherein said further bearing means includes a first guide rod bearing and a second guide rod bearing arranged on respective sides of a wheel center plane extending transversely of the longitudinal center plane of the vehicle, the first guide rod bearing being arranged forwardly of wheel center plane as viewed in the driving direction and the second guide rod bearing is arranged behind the first guide rod bearing, and wherein the first guide rod bearing is constructed so as to be more radially yielding than the second guide rod bearing.

11. An arrangement according to claim 9, wherein said further bearing means includes a first guide rod bearing and a second guide rod bearing arranged behind a wheel center plane extending transversely of the longitudinal center plane of the vehicle as viewed in the driving direction of the vehicle, and wherein the first guide rod bearing is arranged immediately behind the wheel center plane and is constructed so as to be more radially yielding than the second guide rod bearing.

12. An arrangement according to claim 11, wherein the first and second guide rod bearings are arranged at the wheel carrier means at an inclination to the vehicle longitudinal axis.

13. An arrangement according to claim 12, wherein the first and second guide rod bearings are arranged along a common axis.

14. An arrangement according to claim 13, wherein the common axis of the first and second guide rod bearings extends parallel to a pivot axis of the wheel guide means.

15. An arrangement according to claim 14, wherein the first bearing means for pivotally mounting the longitudinal strut means at the vehicle body as viewed laterally of the vehicle is inclined in the vehicle driving direction with respect to a horizontal plane.

16. An arrangement according to claim 15, wherein said first bearing means is fashioned as a metal rubber bearing and includes a plurality of vulcanized stiff intermediate bushings interposed between elastic layers.

17. An arrangement according to claim 16, wherein the longitudinal strut means and the transverse strut means form a crossed wheel guide assembly, and wherein said first and second guide rod bearings are arranged at free ends of the guide assembly.

18. An arrangement to claim 15, wherein said first bearing means is constructed as a sliding bearing for permitting a defined axial movement of the longitudinal strut means.

19. An arrangement according to claim 18, wherein the longitudinal strut means and the transverse strut means form a crossed wheel guide assembly, and wherein said first and second guide rod bearings are arranged at free ends of the guide assembly.

20. An arrangement according to claim 1, wherein said transverse strut means is formed of a leaf spring.

21. An arrangement according to claim 20, wherein means are provided for mounting the leaf spring at the vehicle body so as to permit pivotal movement of the leaf spring relative to the vehicle body.

22. An arrangement according to claim 21, wherein said mounting means includes an elastic bearing element interposed between an end of the leaf spring and the vehicle body.

23. An arrangement according to claim 1, wherein means are provided for mounting the transverse strut means at the vehicle body so as to be pivotal with respect to the vehicle body to permit deflection.

24. An arrangement according to claim 1, wherein said further bearing means includes a first guide rod bearing and a second guide rod bearing arranged on respective sides of a wheel center plane extending transversely of the longitudinal center plane of the vehicle, the first guide rod bearing being arranged forwardly of wheel center plane as viewed in the driving direction and the second guide rod bearing is arranged behind the first guide rod bearing, and wherein the first guide rod bearing is constructed so as to be more radially yielding than the second guide rod bearing.

25. An arrangement according to claim 1, wherein said further bearing means includes a first guide rod bearing and a second guide rod bearing arranged behind a wheel center plane extending transversely of the longitudinal center plane of the vehicle as viewed in the driving direction of the vehicle, and wherein the first guide rod bearing is arranged immediately behind the wheel center plane and is constructed so as to be more radially yielding than the second guide rod bearing.

26. An arrangement according to claim 25, wherein the first and second guide rod bearings are arranged at the wheel carrier means at an inclination to the vehicle longitudinal axis.

27. An arrangement according to claim 1, wherein said further bearing means includes first and second guide rod bearings arranged at the wheel carrier means, and wherein said guide rod bearings have a common bearing axis.

28. An arrangement according to claim 27, wherein the common bearing axis extends parallel to a pivot axis of the wheel guide means.

29. An arrangement according to claim 1, wherein the further bearing means are arranged along a common axis.

30. An arrangement according to claim 29, wherein the common axis of the further bearing means extends parallel to a pivot axis of the wheel guide means.

31. An arrangement according to claim 29, wherein said first bearing means is constructed as a sliding bearing for permitting a defined axial movement of the longitudinal strut means.

32. An arrangement according to claim 3, wherein means are provided for mounting the leaf spring at the vehicle body so as to permit pivotal movement of the leaf spring relative to the vehicle body.

33. An arrangement according to claim 32, wherein said mounting means includes an elastic bearing element interposed between an end of the leaf spring and the vehicle body.

* * * * *